US012760655B2

(12) United States Patent
Stout et al.

(10) Patent No.: US 12,760,655 B2
(45) Date of Patent: Oct. 13, 2026

(54) HIGH TEMPERATURE TURBOMACHINE

(71) Applicant: Calnetix Technologies LLC, Cerritos, CA (US)

(72) Inventors: John Stout, Long Beach, CA (US); Archie A. T. Andonian, Huntington Beach, CA (US); Larry Hawkins, Manhattan Beach, CA (US); Alexei Filatov, Irvine, CA (US); Eric Blumber, Los Angeles, CA (US); Bo Gao, Cypress, CA (US)

(73) Assignee: Calnetix Technologies LLC, Cerritos, CA (US)

( * ) Notice: Subject to any disclaimer, the term of this patent is extended or adjusted under 35 U.S.C. 154(b) by 259 days.

(21) Appl. No.: 18/606,591

(22) Filed: Mar. 15, 2024

(65) Prior Publication Data

US 2025/0290428 A1 Sep. 18, 2025

(51) Int. Cl.

| | |
|---|---|
| ***H02K 21/14*** | (2006.01) |
| ***F01D 15/10*** | (2006.01) |
| ***F01D 25/12*** | (2006.01) |
| ***F01D 25/16*** | (2006.01) |
| ***F04D 3/00*** | (2006.01) |
| ***F04D 25/06*** | (2006.01) |
| ***F04D 29/048*** | (2006.01) |
| ***F04D 29/58*** | (2006.01) |

(Continued)

(52) U.S. Cl.

CPC ............. *F01D 15/10* (2013.01); *F01D 25/12* (2013.01); *F01D 25/16* (2013.01); *F04D 3/005* (2013.01); *F04D 25/06* (2013.01); *F04D 29/048* (2013.01); *F04D 29/5806* (2013.01); *H02K 5/203* (2021.01); *H02K 7/09* (2013.01); *H02K 7/1823* (2013.01); *H02K 9/19* (2013.01); *H02K 11/21* (2016.01); *H02K 21/14* (2013.01)

(58) Field of Classification Search

CPC .......... H02K 11/21; H02K 5/203; H02K 7/09; H02K 9/19; H02K 21/14

USPC .......................................................... 310/90

See application file for complete search history.

(56) References Cited

U.S. PATENT DOCUMENTS 7,638,892 B2 12/2009 Myers
8,146,360 B2 4/2012 Myers et al.

(Continued)

FOREIGN PATENT DOCUMENTS

CN 201982321 U * 9/2011
CN 217652922 U * 10/2022

(Continued)

*Primary Examiner* — Jose A Gonzalez Quinones

(74) *Attorney, Agent, or Firm* — Fish & Richardson P.C.

(57) ABSTRACT

A turbomachine includes an electric machine comprising a rotor and a stator in a housing and a fluid end. The fluid end is configured to drive or expand a fluid of 250° C. or higher. The turbomachine includes measures to mitigate heat transfer from the fluid to the components of the electric machine. The fluid end includes an impeller or turbine in a housing, and the impeller or turbine is coupled to the rotor to rotate at the same speed as the rotor. The housing of the fluid end is hermetically sealed to the housing of the electric machine and configured to receive a portion of the fluid. An active magnetic bearing system supports the rotor. The active magnetic bearing system has an axial bearing actuator about an end of the rotor opposite to the rotor or turbine.

25 Claims, 11 Drawing Sheets

(51) Int. Cl.

| | |
|---|---|
| ***H02K 5/20*** | (2006.01) |
| ***H02K 7/09*** | (2006.01) |
| ***H02K 7/18*** | (2006.01) |
| ***H02K 9/19*** | (2006.01) |
| ***H02K 11/21*** | (2016.01) |

(56) References Cited

U.S. PATENT DOCUMENTS

| | | | | |
|---|---|---|---|---|
| 8,154,158 | B2 | 4/2012 | Saban et al. | |
| 8,350,432 | B2 | 1/2013 | Guedes-Pinto et al. | |
| 8,384,232 | B2 | 2/2013 | Myers et al. | |
| 8,400,005 | B2 | 3/2013 | Huber et al. | |
| 8,739,538 | B2 | 6/2014 | Myers et al. | |
| 8,839,622 | B2 | 9/2014 | Myers et al. | |
| 10,364,815 | B2 | 7/2019 | Stout et al. | |
| 10,605,057 | B2 | 3/2020 | Huynh et al. | |
| 11,296,574 | B1 | 4/2022 | Huynh et al. | |
| 2009/0015012 | A1* | 1/2009 | Metzler | F04D 29/058 415/173.1 |
| 2012/0013125 | A1 | 1/2012 | Myers et al. | |
| 2012/0027567 | A1* | 2/2012 | Agrawal | F04D 25/024 415/151 |
| 2013/0286591 | A1 | 10/2013 | Myers et al. | |

FOREIGN PATENT DOCUMENTS

| | | | | | |
|---|---|---|---|---|---|
| DE | 102015221777 | A1 | * | 5/2017 | H02K 5/203 |
| DE | 102016202886 | A1 | * | 8/2017 | H02K 9/19 |
| EP | 0276839 | B1 | * | 9/1993 | F16J 15/4476 |
| JP | H0650334 | A | * | 2/1994 | F16C 32/044 |
| JP | H07103191 | A | * | 4/1995 | |
| JP | 2016017427 | A | * | 2/2016 | |
| WO | WO-2019073130 | A1 | * | 4/2019 | H02K 9/193 |

* cited by examiner

HIGH TEMPERATURE TURBOMACHINE

TECHNICAL FIELD

This disclosure relates to turbomachines for high temperature applications.

BACKGROUND

Turbomachines are a class of machines with a fluid end having an impeller or turbine to drive or be driven by fluid. In certain instances, the impeller or turbine can be coupled to an electric machine configured as a motor to drive the impeller or a generator to be driven by the turbine to generate electricity. The fluid end components are in direct contact with the fluid operated on by the turbomachine, and must be constructed to withstand the conditions imposed by the fluid, such as the pressures, temperatures and other conditions (e.g., corrosive or reactiveness of the fluid). The electric machine can sometimes come in contact with the fluid, as well, and thus the electric machine components must be constructed to withstand the conditions imposed by the fluid on the electric machine. Constructing the electric machine to work with a fluid end operating on high temperature fluids introduces challenges, because it is difficult to fortify the electrical components against the conditions they may experience.

SUMMARY

This disclosure relates to turbomachines for high temperature applications.

Certain aspects encompass a turbomachine with an electric machine and a fluid end. The electric machine includes an electric machine housing, an electric stator within the housing and an electric rotor. The electric rotor includes permanent magnets, and residing within the stator and electric machine housing and extending from an end of the electric machine housing. A plurality of active magnetic bearing actuators are configured to levitate the electric rotor within the stator and provide both radial and axial support. The fluid end is configured to drive or expand a fluid of 250° C. or higher. The fluid end housing is coupled to and hermetically sealed to the electric machine housing to define a hermetically sealed interior space therein that receives a portion of the fluid. An impeller or turbine within the fluid end housing is coupled about an end of the rotor to rotate at the same speed as the rotor.

Certain aspects encompass a method, the method includes operating a fluid end of a turbomachine to drive a 250° C. or hotter fluid with an impeller or to drive a turbine of the turbomachine with the fluid. The method includes rotating a permanent magnet rotor of an electric machine of the turbomachine at the same speed as the impeller or turbine, the fluid end having a housing sealed to a housing of the electric machine to define a hermetically sealed space therein that receives a portion of the fluid. The method includes levitating the rotor within a stator of the electric machine with a plurality of active magnetic bearing actuators while controlling the axial position of the impeller or turbine.

Certain aspects encompass a turbomachine. The turbomachine includes an electric machine with a rotor and a stator in a housing. A fluid end is configured to drive or expand a fluid of 250° C. or higher. The fluid end includes an impeller or turbine in a housing. The impeller or turbine is coupled to the rotor to rotate at the same speed as the rotor and the housing of the fluid end is hermetically sealed to the housing of the electric machine and configured to receive a portion of the fluid. An active magnetic bearing system fully supports the rotor.

Certain of the aspects can include some, none or all of the following features. For example, the impeller or turbine can be an axial impeller or turbine and the fluid end housing can be a volute. In certain instances, the impeller or turbine is a shrouded centrifugal type and the fluid end housing is sealed to a surface of the shroud. In certain instances, the impeller or turbine comprises multiple stages. In certain instances, the turbomachine incudes an axial position sensor about the first end of the rotor, configured to measure the axial position of the first end of the rotor, and an axial magnetic bearing controller communicatively coupled to the first of the bearing actuators and the axial position sensor. The controller is configured to control the axial position of the rotor relative to the electric machine housing based on a signal from the axial position sensor. A second bearing actuator is configured to provide radial support of the rotor and is positioned at an opposite end of the electric machine housing from the first bearing actuator. A heat transfer housing can be provided concentrically within and in contact with an inner surface of the electric machine housing. The heat transfer housing and electric machine housing define a cooling fluid space therebetween. In certain instances, the heat transfer housing includes a helical channel on its outer surface that defines a portion of the cooling fluid space. In certain instances, a sleeve is provided between the heat transfer housing and the stator, supporting the stator. The sleeve has axial flow passages therethrough. In certain instances, a thermally insulative washer is clamped between the impeller or turbine and the rotor. The electric machine housing can include a front end face sealed to the outer surface of the rotor by a seal, and a heat shield spaced from the front end face substantially covering the front end face and seal. In certain instances, a first of the bearing actuators is configured to provide axial control of the rotor position and is positioned about an end of the rotor opposite the end coupled to the impeller or turbine.

The details of one or more implementations of the subject matter described within this disclosure are set forth in the accompanying drawings and the description below. Other features, objects, and advantages of the subject matter described herein will be apparent from the description and drawings, and from the claims.

DESCRIPTION OF DRAWINGS

Like reference symbols in the various drawings indicate like elements. The drawings are not to scale.

DETAILED DESCRIPTION

There are numerous systems that operate on high temperature fluid. For example, power generation systems utilizing supercritical carbon dioxide as the working fluid have significantly higher efficiency and power density than more traditional air Brayton and steam Rankine cycle systems. Additionally, some modern Gen IV nuclear reactors require circulating cooling fluids through the reactor at temperatures exceeding 500° C. The concepts herein encompass hermetically sealed turbomachines, utilizing an Active Magnetic Bearing (AMB) system. The hermetically sealed turbomachines are ideal for these types of applications due to extremely low leakage rates and the fact that AMBs do not require lubrication, which can contaminate the fluid operated on by the turbomachine. AMBs also operate without mechanical contact and with relatively large clearances (tens of mils), which prevent possible seizures due to rotor growth at high temperatures.

Figure 1A:
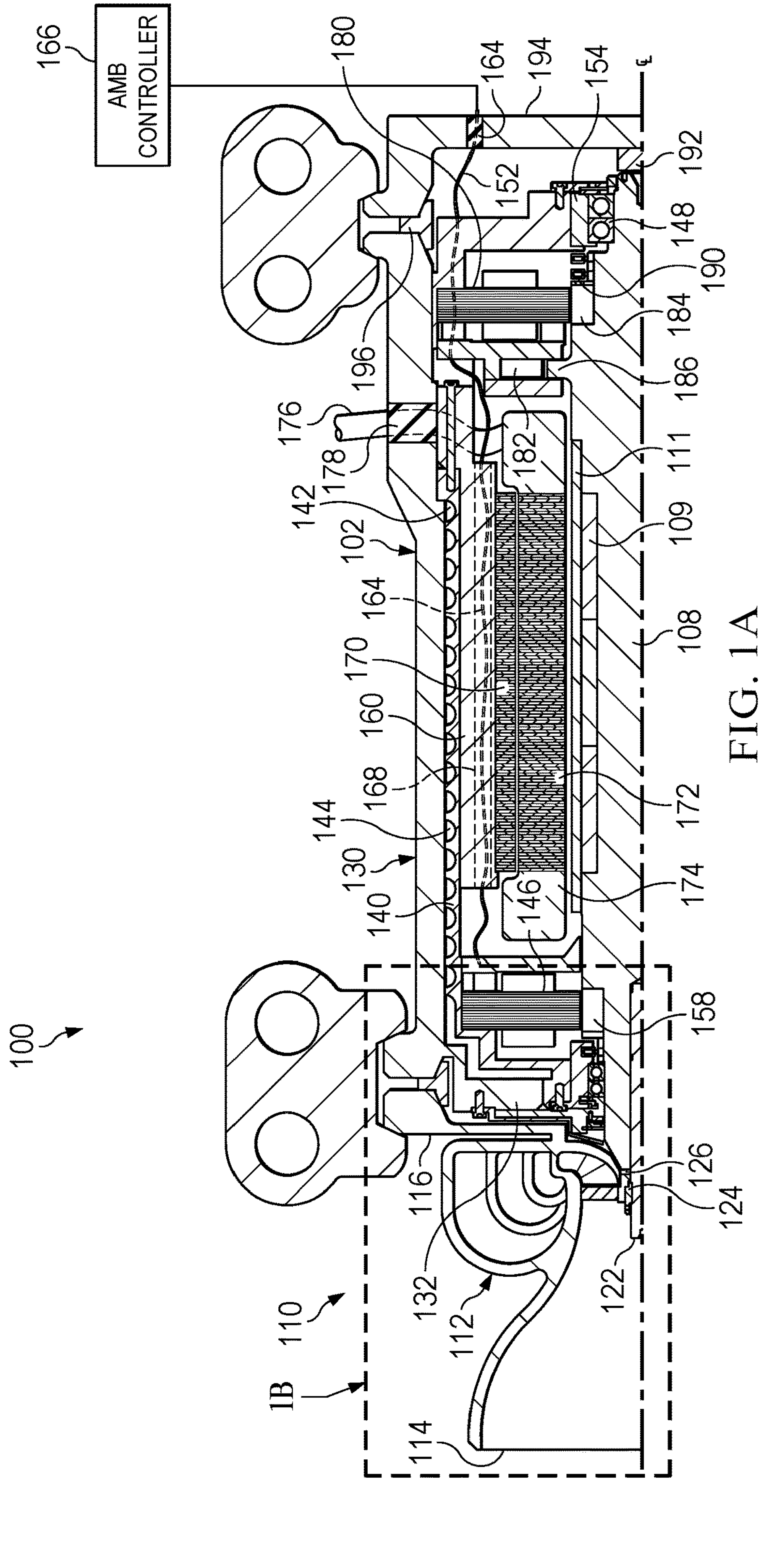
FIG. 1A is a quarter cross-sectional view of a turbomachine with an axial impeller, the machine constructed in accordance with the concepts herein.
Figure 1B:
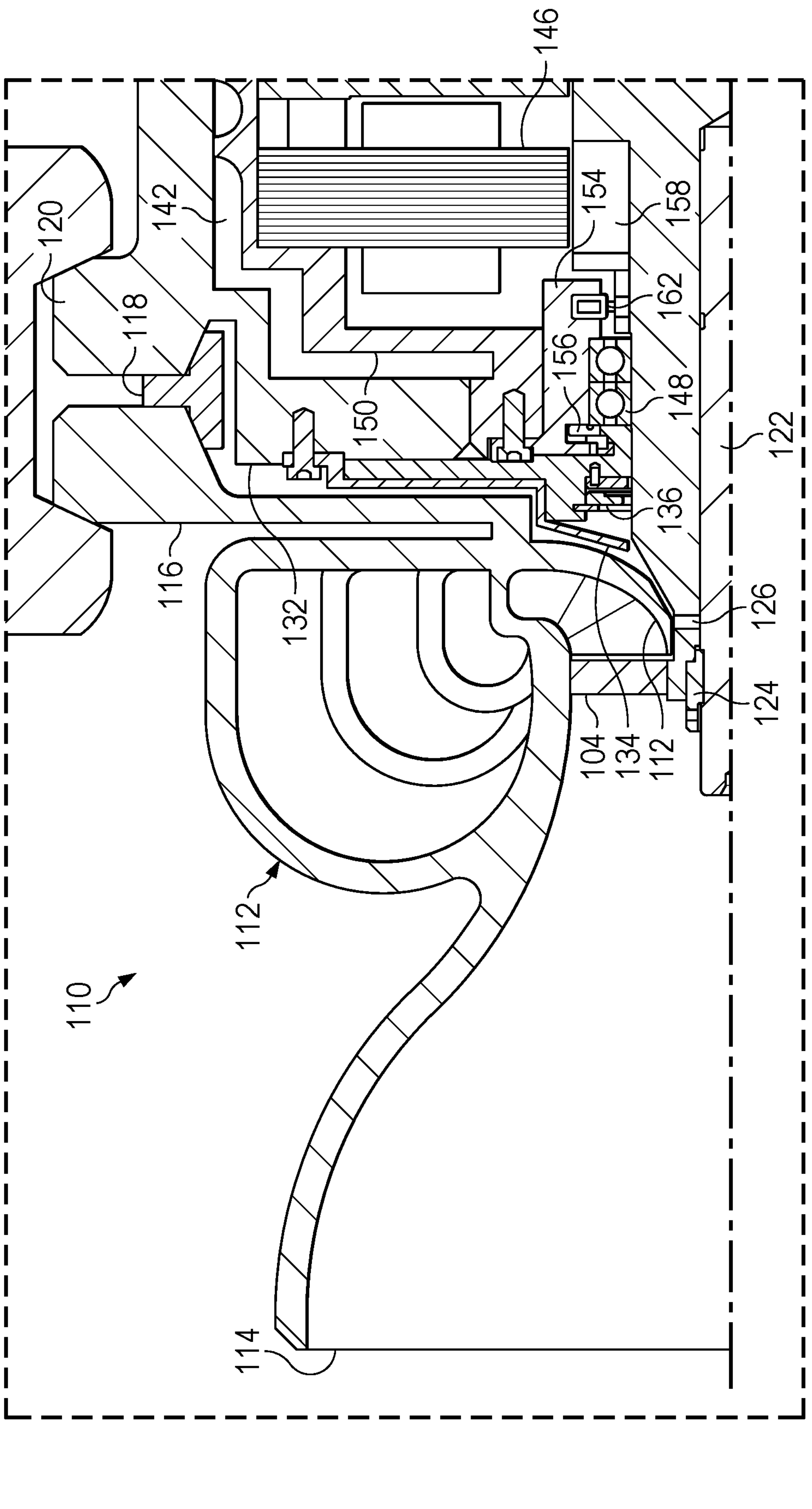
FIG. 1B is a detail view of the turbomachine of FIG. 1A.

FIG. 1A is a schematic quarter cross-sectional view of an example hermetically sealed turbomachine 100 in accordance with the concepts herein. FIG. 1B is a detail view thereof. The turbomachine 100 includes a fluid end 110 coupled to a high-performance, high-speed permanent magnet electric machine 102 (e.g., motor and/or generator) configured as a direct drive system with a low loss AMB system. The electric rotor 108 of the machine 102 is levitated by AMB actuators creating a frictionless (entirely or nearly frictionless) interface between dynamic and static components, and the arrangement of AMB actuators allows 5-axis control of the rotor 108. The turbomachine 100 can be configured to operate as a compressor or pump, driven by the electric machine 102 operating as a motor, and/or it can be configured to operate as a turboexpander and drive the electric machine 102 to generate electricity. The turbomachine 100, and its components, are designed to operate on high temperature fluid (e.g., gas), 250° C. or greater, and in some instances 300°, 400°, 500°, 600° or even higher. Thus, the materials of the components and seals are designed to withstand the respective temperatures they experience when the turbomachine is operating on fluid of these temperatures. Furthermore, as explained below, the turbomachine 100 includes measures to mitigate heat transfer from the fluid to the components of the turbomachine to facilitate operating on fluid of these temperatures.

The fluid end 110 has a fluid end housing 112 that surrounds and encloses the impeller 104. In FIGS. 1A and 1B, the fluid end housing 112 defines a volute internal passageway that encircles the impeller 104 with an axial opening 114 axially forward of the impeller 104 and a circumferential opening (out of view in the cross-section of FIGS. 1A and 1B). In certain instances, the axial opening 114 is an inlet and the circumferential opening is an outlet, so that fluid flows from the axial opening 114 to the circumferential opening, and out of the fluid end housing 112. Other configurations of fluid end housing 112 are contemplated herein.

Figure 1C:
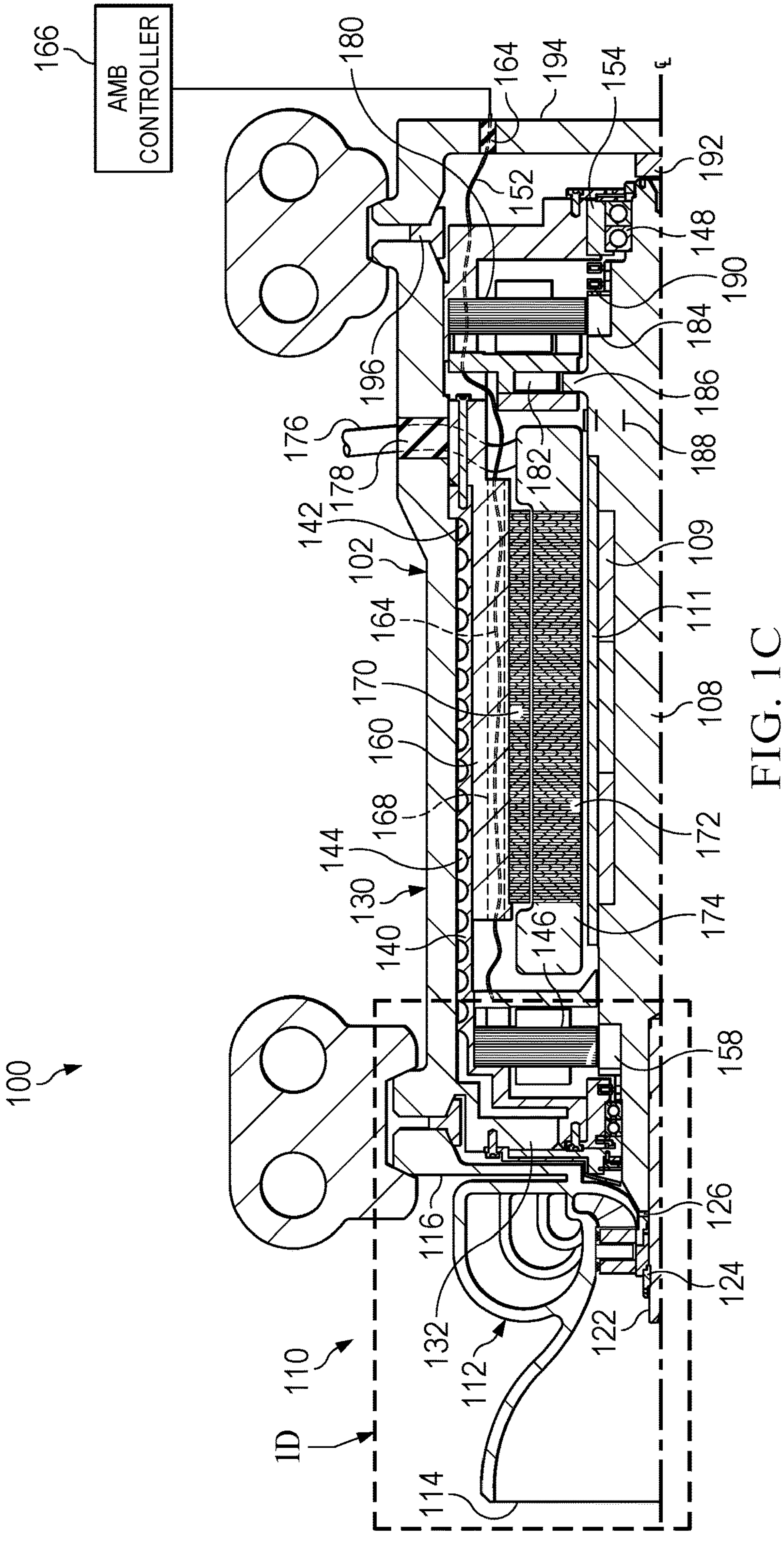
FIG. 1C is a quarter cross-sectional view of an alternate turbomachine similar to that of FIG. 1A, but having a dual stage axial impeller, the machine constructed in accordance with the concepts herein.
Figure 1D:
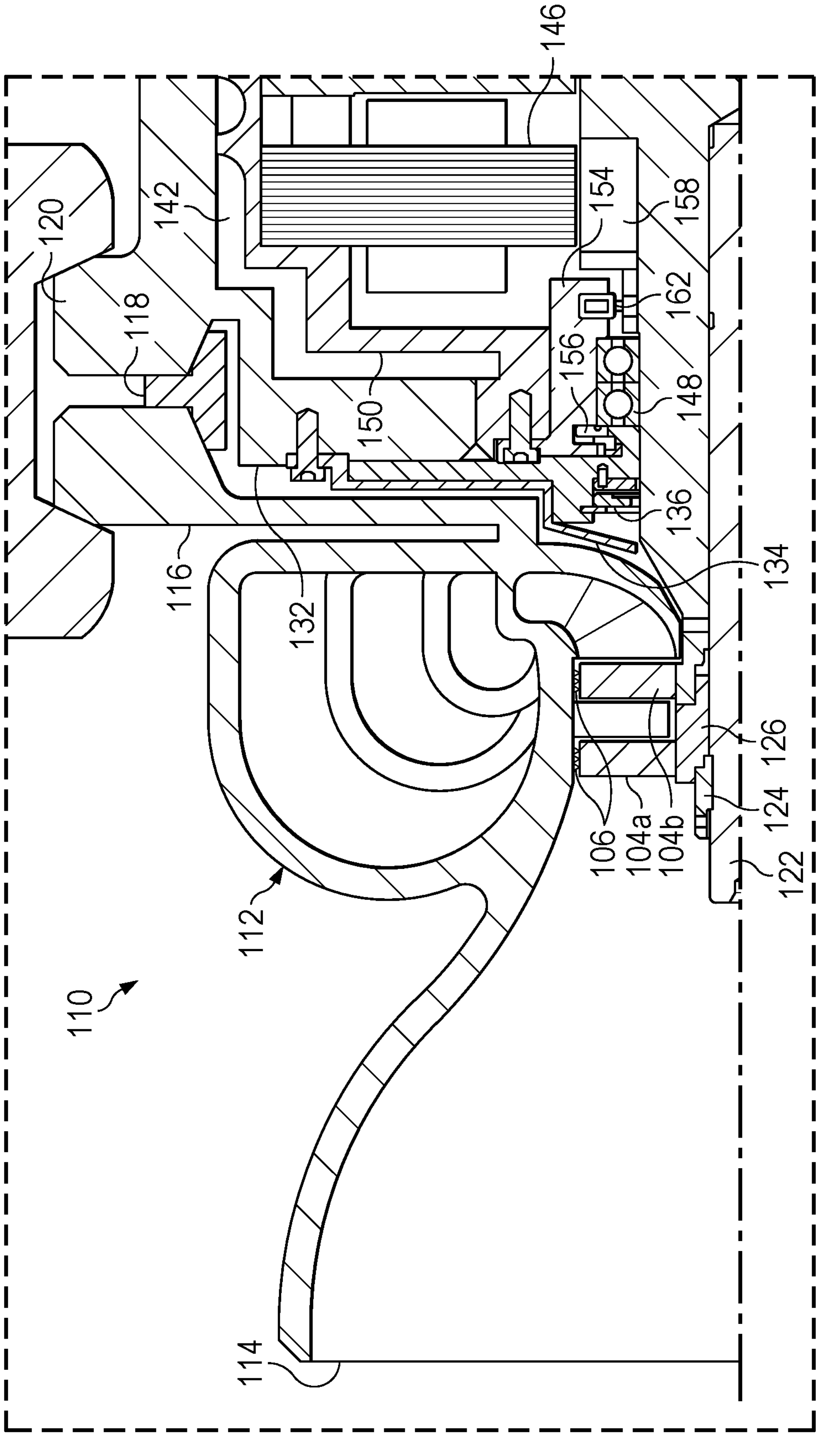
FIG. 1D is a detail view of the turbomachine of FIG. 1C.

When the turbomachine 100 is configured to pump or compress fluid, the impeller 104 is configured to drive (e.g., pump or compress) fluid. When the turbomachine 100 is configured as a turboexpander, the impeller 104 is a turbine configured to be rotated by expansion of fluid through the turbine. In either instance, the impeller 104 is of a type with a low sensitivity to axial position. For example, in certain instances, the impeller 104 is an axial impeller (FIGS. 1A and 1B), which has a low sensitivity to axial position because it relies only on close passage of its blades to an encircling circumferential surface of the housing 112 to operate. Thus, the encircling circumferential surface can be axially longer than the axial length of the axial impeller to allow the impeller to move axially without impacting its operating performance. As shown in FIGS. 1C and 1D, in certain instances, the impeller 104 can be configured as a multi-stage axial impeller, with a first stage impeller **104*a* that feeds flow from its outlet to an inlet of a second stage impeller 104*b***. Additional stages could be provided.

Figure 2A:
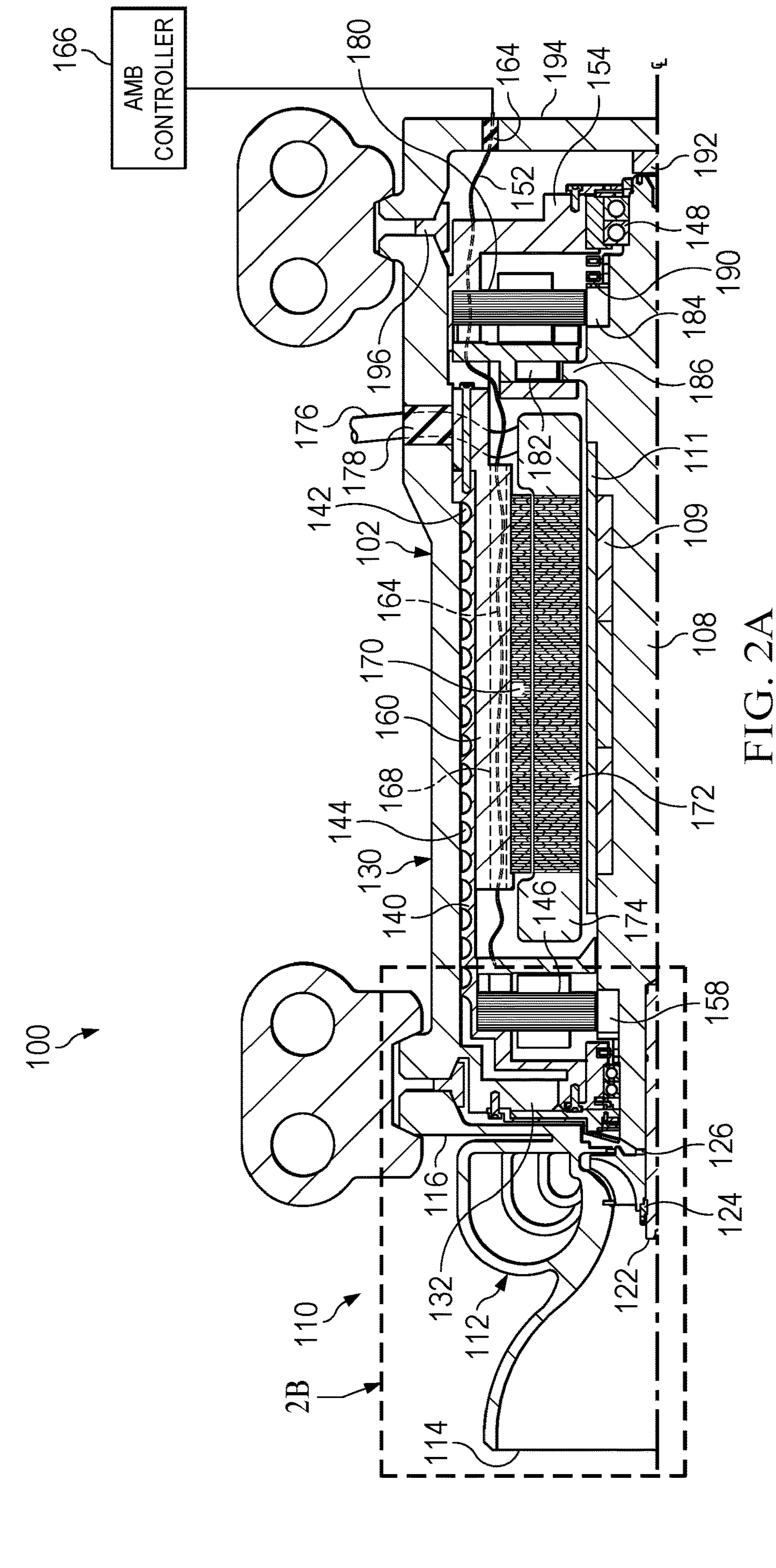
FIG. 2A is a quarter cross-sectional view of a turbomachine similar to that of FIG. 1A, but including a shrouded centrifugal impeller, the machine constructed in accordance with the concepts herein.
Figure 2B:
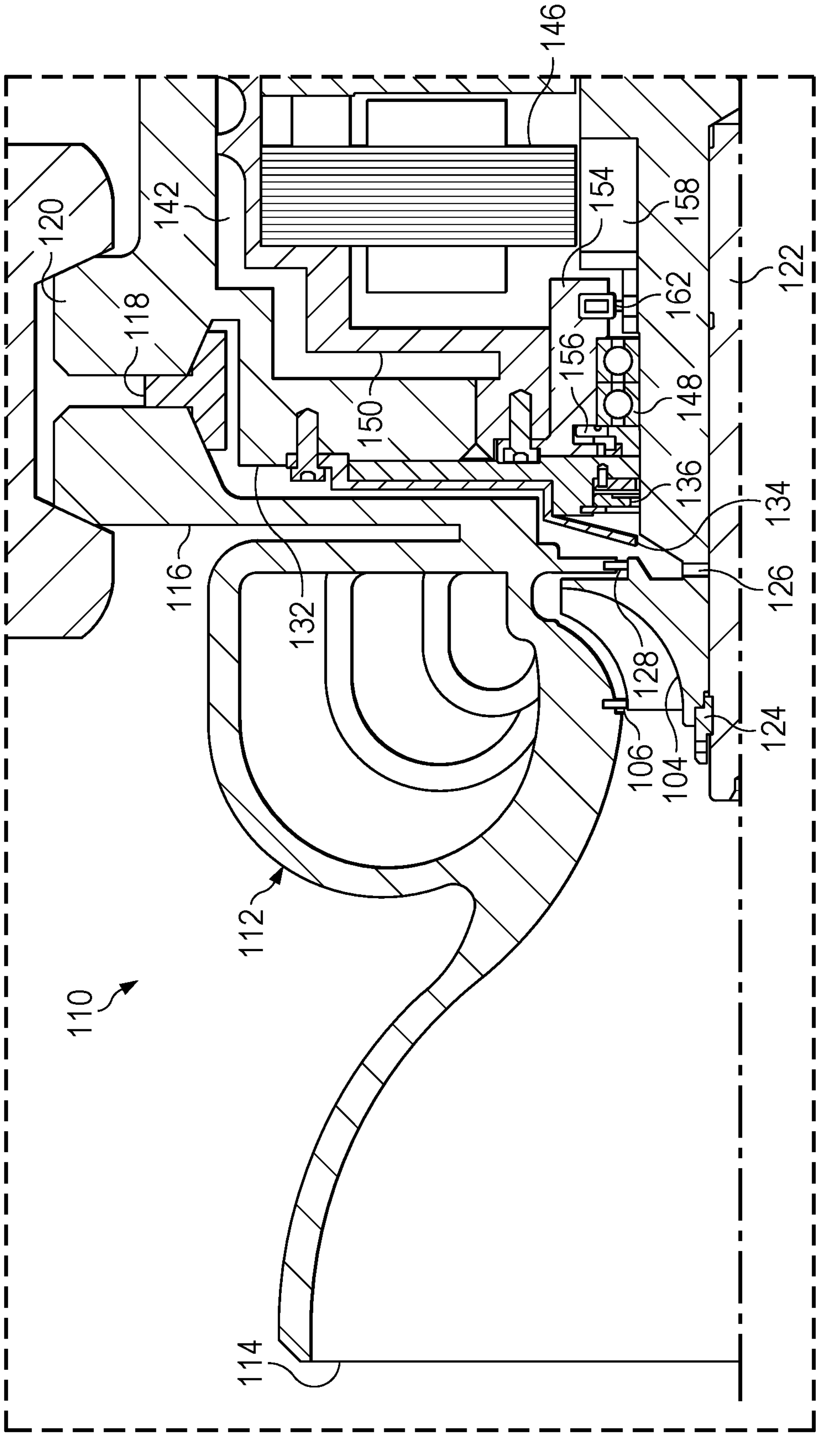
FIG. 2B is a detail view of the turbomachine of FIG. 2A.
Figure 2C:
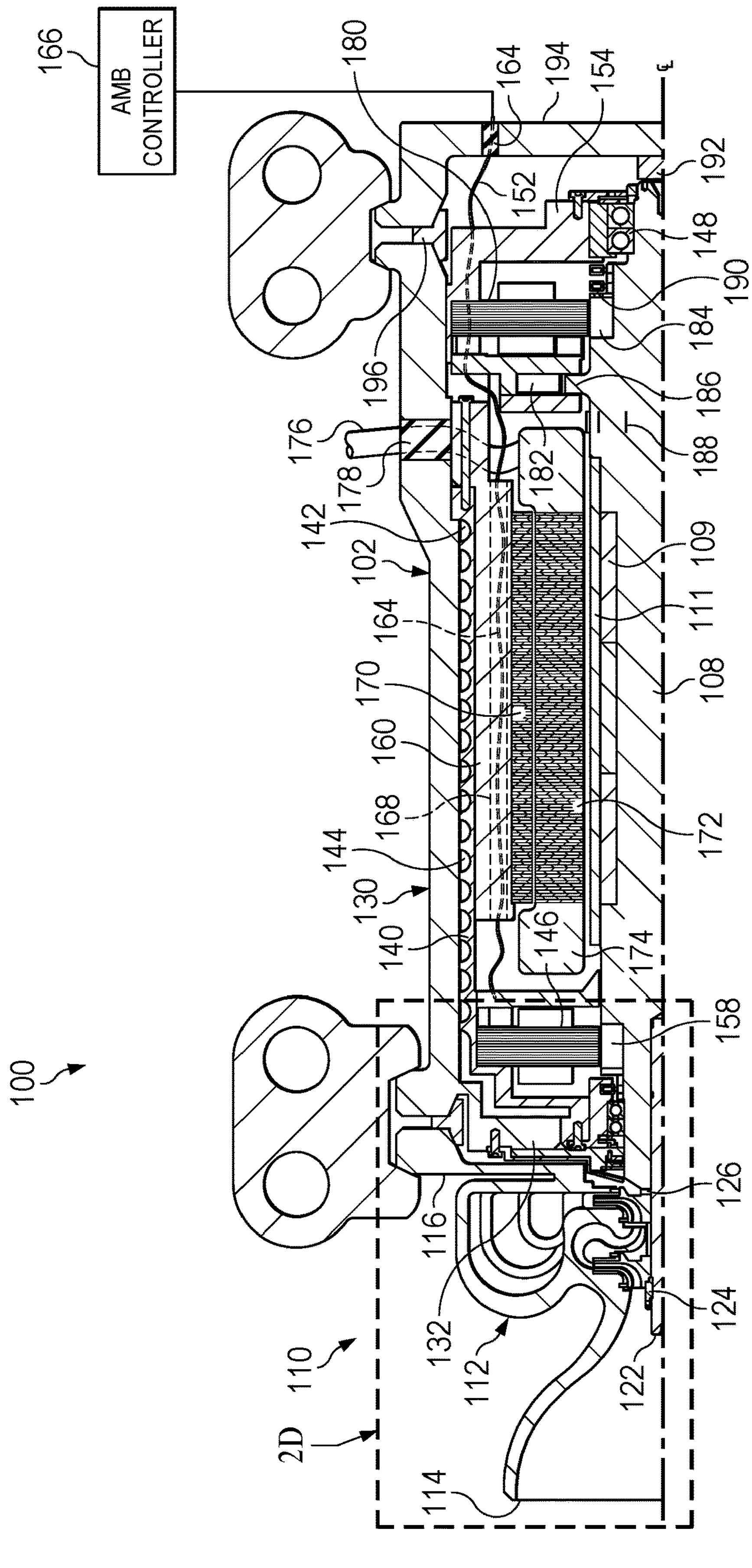
FIG. 2C is a quarter cross-section view of an alternate turbomachine similar to that of FIG. 2A, but including dual shrouded centrifugal impellers, the machine constructed in accordance with the concepts herein.
Figure 2D:
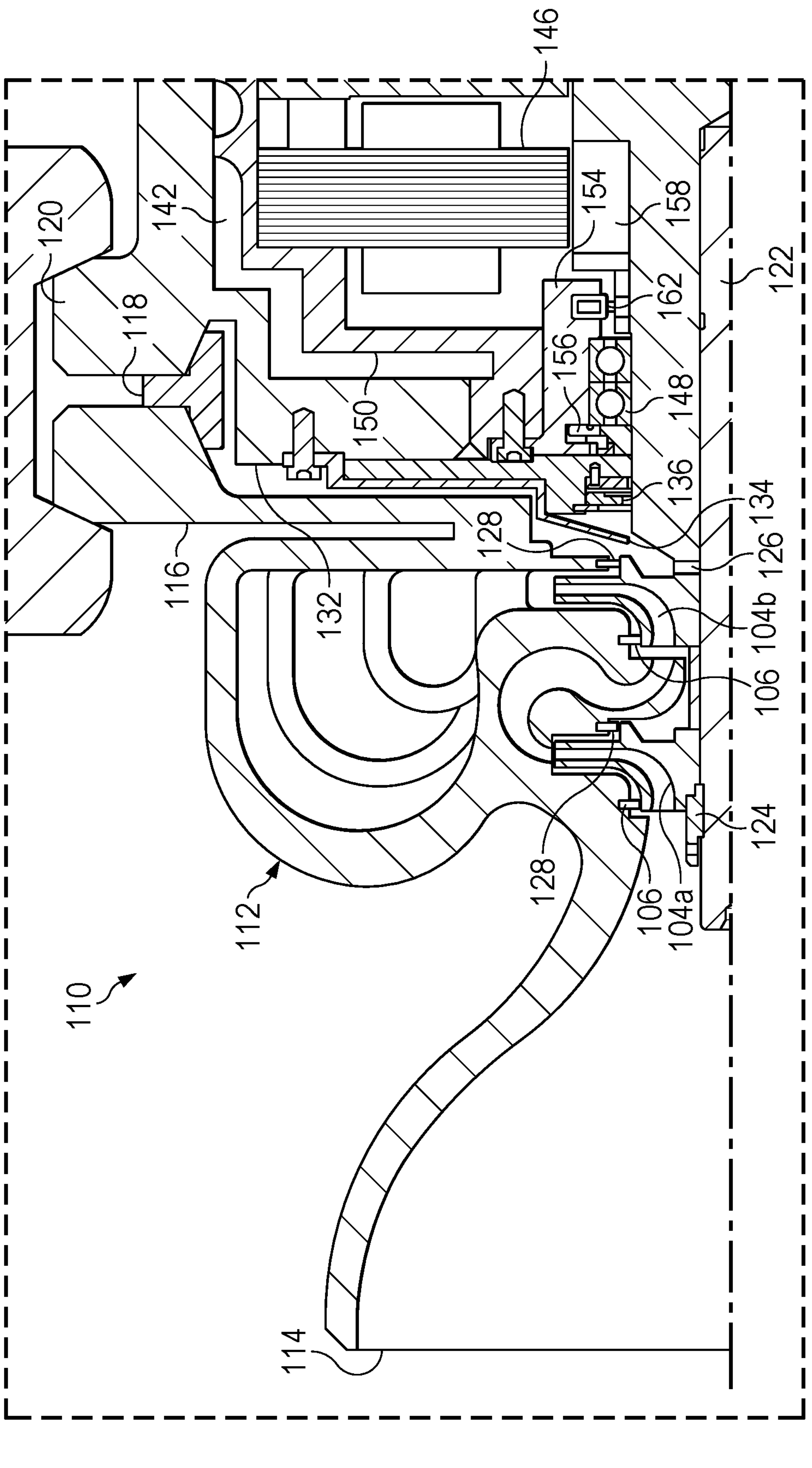
FIG. 2D is a detail view of the turbomachine of FIG. 2C.
Figure 2E:
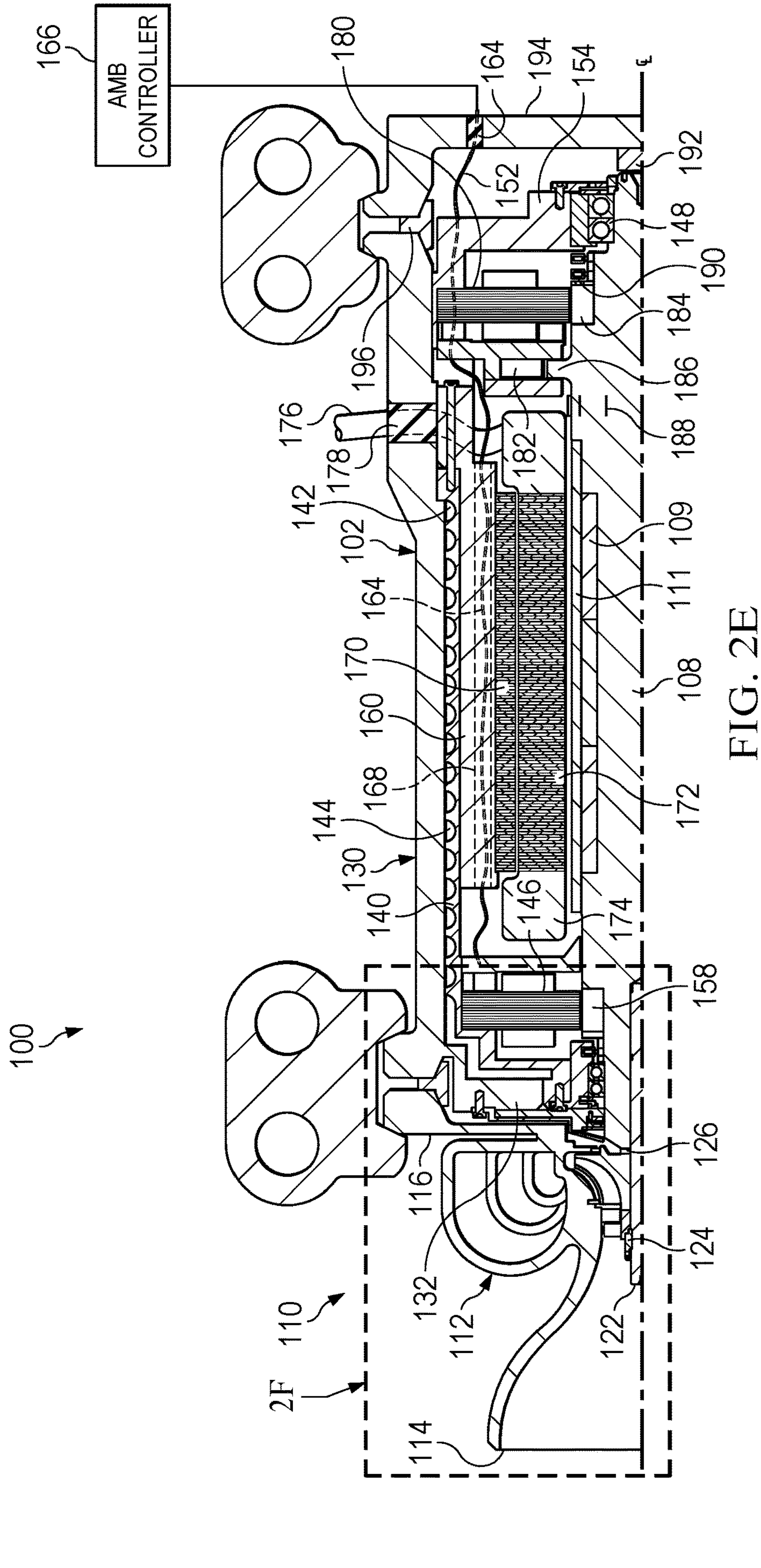
FIG. 2E is a quarter cross-section view of an alternate turbomachine similar to that of FIG. 2A, but having an axial impeller and a shrouded centrifugal impeller, the machine constructed in accordance with the concepts herein.
Figure 2F:
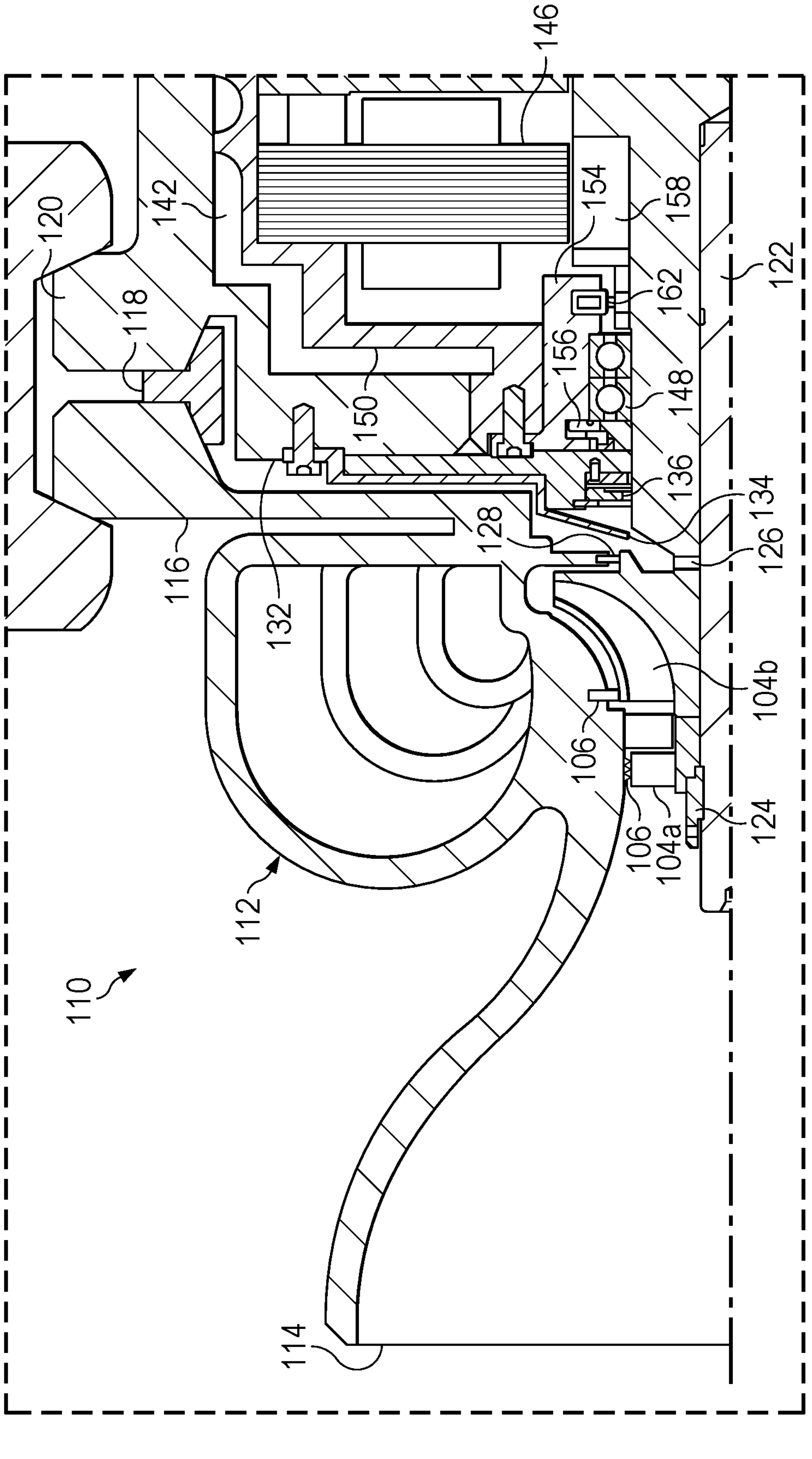
FIG. 2F is a detail view of the turbomachine of FIG. 2E.

Whether single stage or multi stage, the axial impeller can be shrouded, with a continuous shroud around their perimeter surface. The axial impellers **104*a* and 104*b* in FIGS. 1C and 1D are shown shrouded. FIGS. 2A and 2B show the turbomachine 100 otherwise the same as discussed herein, but using a shrouded centrifugal impeller 104. Unlike an unshrouded centrifugal impeller, which relies on a highly controlled, tight spacing between the at least partially axially facing edges of the blades and the surrounding surfaces of a housing to seal fluid to flow through the wheel, a shrouded impeller has a shroud attached to the outer edges of the blades. The shroud and blades define enclosed passages through the wheel that do not depend on the position of the wheel relative to the housing. FIGS. 2C and 2D show the impeller 104 configured as a multi-stage centrifugal arrangement, with a first stage impeller 104*a* and a second stage impeller 104*b* (both shrouded), together in a volute that encloses both stage impellers 104*a*, 104*b* and directs the flow exiting the outlet first stage impeller 104*a* into the inlet of the second stage impeller 104*b*. Although only two stages are shown, additional stages could be provided. The impeller 104 could also be configured as a multi-stage axial and centrifugal arrangement, with a first stage impeller 104*a* and a second stage impeller 104*b*, where one stage is axial (shown as the first stage) and one stage is centrifugal. As illustrated, both impellers 104*a*, 104*b*** are shown as shrouded, but in certain instances the axial impeller is unshrouded. Again, although only two stages are shown, additional stages could be provided.

Whether centrifugal or axial, the shrouded type impellers 104 (or impellers **104*a* or 104*b*) can be sealed to the surrounding housing with one or more seals 106, between the shroud and the housing that seal against passage of fluid past the exterior of the impeller 104, and direct fluid flow into the enclosed passages. The seal 106 has a degree of compliance, and can maintain a seal despite axial movement of the impeller 104 that would substantially degrade the performance of an unshrouded wheel. In certain instances, seal 106 is a brush seal. An additional seal 128 (FIGS. 2A and 2B) can be provided to seal against the centrifugal impeller 104**, preferably against a radial facing surface thereof.

The fluid end 110 (including the fluid end housing 112) is coupled to the housing 130 of the electric machine 102 in a manner that thermally insulates it from the components of the electric machine 102 to mitigate heat transfer to the electric machine 102. The fluid end 110 includes an annular flange 116 that couples to a corresponding flange of the electric machine housing 130. The connection is hermetically sealed by a gasket 118. Rather than extending from the outer diameter of the fluid end housing 112, the annular flange 116 extends from a location radially inward of the radial midpoint of the fluid end housing 112, spaced from the back wall of the fluid end housing 112. The annular flange 116 and its spacing from the fluid end housing 112 are shaped to provide a large surface area both on the fluid end housing 112 and the annular flange 116 to facilitate dissipating heat from the fluid in the fluid end housing 112, as well as to reduce heat transfer from the fluid in the fluid end housing 112 to the electric machine 102. Furthermore, the shape of the flange 116 provides a long path for conductive heat transfer to the housing 130 of the electric machine 102 further mitigating heat transfer to the electric machine 102.

The electric machine housing 130 encloses an electric stator 170 and the majority of the rotor 108. The rotor 108 is generally cylindrical, having portions of different diameter. The rotor 108 includes permanent magnets that generate the magnetic field of the rotor 108 that enables the stator 170 to drive the rotor 108 or enables the rotor 108 to generate current in the stator 170. The permanent magnets 109 are retained to the remainder of the rotor with a sleeve 111 that encircles and contains the magnets 109, as well as shields the magnets from contact with the fluid. The rotor 108 has a nose into which a tie bolt 122 is threaded, the tie bolt 122 extending through the front end wall 132 of the electric machine housing 130 and coupling the impeller 104 to the rotor 108. As noted above, the coupling is a direct coupling, having no transmission or gearbox, such that the rotor 108 and impeller 104 rotate at the same speed. The electric machine 102 is thus a high speed type machine in that electric machine 102 can operate at the rotational speeds necessary to drive fluid with the impeller 104 or the rotational speeds generated by the impeller 104 when configured and operated as a turbine.

FIGS. 1A and 1B show the tie bolt 122 extending through a central opening in the impeller 104 and clamped the impeller 104 between a shoulder of rotor 108 and a nut 124 threaded to the tie bolt 122. Other manners of attaching the impeller 104 to the rotor 108, however, are within the concepts herein. Notably, there is a thermally insulative washer 126 clamped between the impeller 104 and the shoulder of the rotor 108. The washer 126 is constructed of a low thermally conductive material, e.g., ceramic and/or anther material, having a lower thermal conductivity than the material of the rotor 108 and/or the impeller 104 to reduce heat transfer between the impeller 104 (heated by the fluid) and the rotor 108.

The inner diameter of fluid end housing 112 extends close to the exterior of the rotor 108 to reduce (e.g., minimize) interchange of fluid from the housing 112 to the electric machine 102. In certain instances, a seal 128 can be placed between the fluid end housing 112 and the impeller 104 (e.g., FIGS. 2A and 2B), near the attachment of the impeller 104 to seal against interchange of hot fluid from the fluid end housing 112 to the electric machine 102. In certain instances, the seal 128 is a brush seal. Any fluid that leaks past this seal 128 will migrate into the housing 130.

The fluid end housing 112 and the electric machine housing 130 define an internal space that is hermetically sealed from the environment around the turbomachine 100. In other words, any fluid that enters the inlet of the fluid end housing 112 must exit the outlet of the fluid end housing 112, or be contained in the internal space bounded by the housings 112, 130. No fluid can enter the environment around the turbomachine 100.

The housing 130 includes a front end face 132 through which the rotor 108 protrudes into the fluid end housing 112. In certain instances, the front end face 132 carries a seal 136 that seals to the rotor 108 to reduce (e.g., minimize) interchange of hot fluid from the housing 112 to the electric machine 102. The front end face 132 extends from the rotor 108 to the outer diameter of the housing 130. A thin, annular heat shield 134 is mounted to the front end face 132, substantially covering the front end face 132 (e.g., covering more than half or more than ⅔s of the face). Other than at its attachment point to the front end face 132, the heat shield 134 is spaced apart from the face 132 to mitigate heat transfer from the fluid in the fluid end housing 112 to the remainder of the electric machine 102. The heat shield 134 reduces the heat transfer into the housing 130 that may need to be removed by active cooling. The heat shield 134 additionally covers and shields the seal 136 from heat transfer from the fluid in the fluid end housing 112. In certain instances, the seal 136 is a brush and/or a labyrinth seal or can be omitted entirely. Any fluid from the fluid end housing 112 that leaks past seal 136 is contained within the housing 130 of the turbomachine 100. Eventually, the fluid leaked during operation will pressurize the interior of the housing 130 to limit the passage of, and thus heat transfer from, new, hot fluid from the fluid end housing 112 into the housing 130.

The electric machine 102 includes an inner heat transfer housing 140 that resides concentrically within housing 130. The inner heat transfer housing 140 is attached at the front end face 132, and extends radially from a location near the outer surface of the rotor 108 toward and into contact with an inner circumference of the housing 130. The inner heat transfer housing 140 then extends in contact with the inner circumference of the housing 130 over most of the axial length of the housing 130 (more than half or more than ⅔s the axial length) to provide substantial contact for conductive heat transfer with the housing 130. The inner heat transfer housing 140 and housing 130 define a fluid space 142 therebetween through which cooling fluid (e.g., liquid coolant, water and/or another fluid) can be circulated through the electric machine 102 to extract heat from the machine 102. The fluid space 142 is defined in part by a channel 144 in outer circumferential surface of the inner heat transfer housing 140. The channel 144 is shown to be helical, spiraling along the length of the heat transfer housing 140, but in other instances it could be a series of connected annular channels and/or configured in another shape. The channel 144 is configured to allow fluid in the channel 144 to contact both the heat transfer housing 140 and the inner circumferential surface of the housing 130. In certain instances, the inner heat transfer housing 140 is sealed to the housing 130 or positioned close to the housing 130 in this region, so the fluid is forced to traverse the channels 144. In certain instances, the heat transfer housing 140 is welded to the housing 130 to practically be one piece. Although not shown, ports are provided through the housing 130 to fill and circulate the cooling fluid through the fluid space 142. Circulation of the cooling fluid through the fluid space 142 removes heat from the electric machine 102. The axially facing front end face of the inner heat transfer housing 140 is spaced from the front end wall 132 of the housing 130 to further mitigate heat transfer from the fluid to the interior of the inner heat transfer housing 140.

The inner heat transfer housing 140 supports a radial actuator 146 of the AMB system and a mechanical, radial backup bearing 148 in the interior of the inner heat transfer housing 140. The fluid space 142 extends into the axial space between the front end face 132 of the housing 130 and the front end face 150 of the inner heat transfer housing 140 to further mitigate heat transfer to the radial actuator 146. The radial actuator 146 includes the coils controlled by the AMB controller 166 to radially levitate and control the radial position of the rotor 108 proximate the actuator during operation. In certain instances, the radial actuator 146 may additionally include permanent magnets to assist in radially levitating the rotor 108. The radial actuator 146 interfaces with a target 158 on the rotor 108. Mechanical backup bearings 148 are supported in a cavity of a bearing carrier 154 in the inner housing 140, also in the inner space of the heat transfer housing 140, protected from heat transfer. The cavity is a small amount axially longer than the bearings 148 to accommodate a spring 156 that axially biases the bearings 148 against an opposing end of the cavity (i.e., preloading the bearings 148), and allows for axial thermal growth of the bearings 148. A radial position sensor 162 is positioned near the actuator 146 to measure the radial position of the rotor 108 for use by the AMB controller 166 in controlling the actuator 146. The radial position sensor 162 is within the interior of the inner heat transfer housing 140 to protect it from the heat of the fluid in the fluid end housing 112.

A sleeve 160 is concentrically positioned within the inner heat transfer housing 140. The sleeve 160 concentrically surrounds and supports the stator 170 in the housing 130. The stator 170 includes a stator core 172 that carries windings 174, and the windings 174 are connected through the housing 130 to an external power cable 176 (i.e., external to the housing 130) via a hermetically sealed pass-through 178. The stator core 172 is in contact with the sleeve 160 for conductive heat transfer to the sleeve 160. The sleeve 160, in turn, is in contact with the inner circumference of the heat transfer housing 140 over most of the axial length of the housing 140 (more than half or more than ⅔s the axial length) to provide substantial contact for conductive heat transfer with the housing 140. The sleeve 160 includes multiple axial flow passages 168 therethrough, open at each end to allow circulation of fluid in the housing 130 axially through the sleeve 160 and around the stator 170. Fluid can further circulate axially through the gap between the outer diameter of the rotor 108 and the inner diameter of the stator 170. The circulation of fluid in the housing 130 further reduces (e.g., removes) windage and rotor losses. In certain instances, as shown in FIG. 1C, the flow can be assisted by blower paddles 188 positioned in the gap between the rotor 108 and stator 170, and coupled to the rotor 108 to rotate with the rotor 108. The paddles 188 are configured to drive the fluid flow through the gap when rotated. One or more of the axial passages 168 can accommodate the wiring 152 (control, communication, and/or power) for the radial actuator 146 and radial position sensor 162, as well as any other wiring that may need to traverse the electric machine 102. The wiring 152 exits the housing 130 via a hermetically sealed pass-through 164.

A second radial actuator 180 and axial actuator 182 (or a combination radial/axial actuator) of the AMB system is shown positioned in and supported by the housing 130 at an opposite end of the rotor 108 from the actuator 146 and fluid end 112. The radial actuator 180 acts on a corresponding target 184 in the rotor 108, and the axial actuator 182 act on another corresponding target 186 in the rotor 108. As above, the radial actuator 180 includes coils (or coils cooperating with a permanent magnet) coupled to and controlled by the AMB controller 166 to radially levitate and control the radial position of the rotor 108 proximate the actuator during operation. The axial actuator likewise includes coils (or coils cooperating with a permanent magnet) coupled to and controlled by the AMB controller 166 to control the axial position of the rotor 108, and thus the impeller 104 in the housing 112. A second radial position sensor 190 and an axial position sensor 192 are positioned near the actuators 180, 182, with the axial position sensor 192 positioned at the axial end face of the rotor 108 to measure the position of the axial end face of the rotor 108. The position sensors 190, 192 are communicatively coupled to the AMB controller 166 via the wiring 152. Because of their relative large distance from the fluid in fluid end housing 112, heat transfer to these actuators and sensors is mitigated. They need not be as fortified from the heat of the fluid as those nearer the fluid end 110. The concepts herein, of course, likewise encompass a turbomachine having AMB position sensors residing closer to the fluid end 112. A second set of mechanical radial and axial backup bearings 148 are supported in a cavity of a bearing carrier 154 in the housing 130. The housing 130 includes an end cap 194, hermetically sealed to the remainder of the housing 130 by a gasket 196.

The AMB controller 166 can control the AMB actuators 146, 180, 182 to control the rotor 108 position based on the position signals read from the sensors 162, 190, 192. The controller 166 can likewise account for and control the impeller 104 position relative to the fluid end housing 112. The impeller 104 being of a type with a low sensitivity to axial position (as discussed above) enables the axial position of the rotor 108 to be sensed and acted upon by the actuator 182 from the end of the rotor 108 opposite the impeller 104, rather than at a location near the impeller 104. In other words, the turbomachine 100 is less sensitive to rotor position, axial thermal growth of the rotor 108, and impeller 104 position relative to the fluid end housing 112 such that the position of the impeller 104 can determined by calibration and calculation performed by a control algorithm in the AMB controller 166 rather than direct measurement near the impeller 104. Additionally, the impeller 104 performance, and correspondingly the turbomachine 100 performance, is more consistent across temperature variation of the fluid. A heat protected axial position sensor is not needed near the impeller end of the rotor 108 to measure the impeller position. Additionally, the heat generated by the axial actuator 182 in the rotor 108 when operating, due to eddy currents induced in the target 186, does not become an issue, because it is so far displaced from the heat of the fluid. Were the axial actuator 182 near the impeller 104, the heat the actuator produces would be additive to the heat of the fluid, creating more difficulties in addressing the heat of the fluid.

Figure 3:
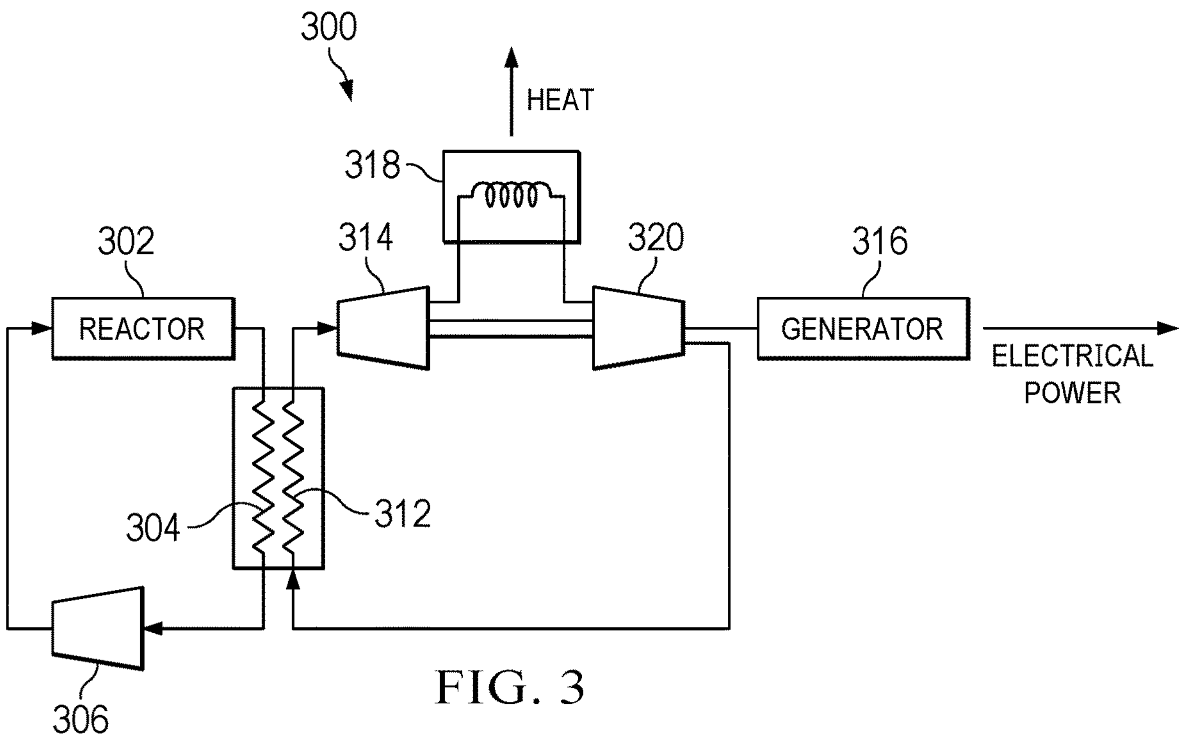
FIG. 3 is a schematic of an example nuclear reactor.

FIG. 3 is a schematic of an example nuclear reactor power generation system 300. The reactor system 300 can, in certain instances, be a Gen IV nuclear reactor system. The system 300 includes a nuclear reactor 302 that heats a heat transfer fluid circulated in a loop including a heat exchanger 304 via a circulator 306 (e.g., a pump and/or compressor). Heat is extracted from the reactor heat transfer fluid and used directly or used, as shown in FIG. 3, as a source of heat for thermal power generation cycle 310, such as a Rankine or organic Rankine cycle or other thermal power generation cycle. The power generation cycle 310 includes a heat exchanger 312 integrated with or in heat transfer with the heat exchanger 304 to receive heat from the heated reactor heat transfer fluid. That heat is used to heat a working fluid of the thermal cycle 310. The heated fluid is expanded through a turbine 314 to drive a generator 316 to generate electric power. The resultant lower pressure, lower temperature working fluid exiting the turbine 314 is passed through a condenser 318 to cool it and then compressed through a compressor 320. In certain instances, the compressor 320 is also driven by the turbine 314. The compressed working fluid is recirculated back to the heat exchanger 312 to again be heated by heat from the heat transfer working fluid of the reactor. The turbomachines described above can be incorporated as the circulator 306 with the reactor heat transfer fluid flowing through the hermetically sealed housing of the turbomachine. Alternately, or additionally, the turbomachines as described above can be used as the turbine 314 and/or the compressor 320. In the case of a turbomachine as described above being used as the turbine 314, the generator 316 can be a separate generator or the electric machine of the turbomachine. If the turbine 314 and compressor 320 are not on the same shaft, in the case of a turbomachine as described above being used as the compressor 320, the electric machine of the turbomachine can be operated as a motor to drive the compressor 320. The turbomachine can be configured such that the heated working fluid flows through the hermetically sealed housing of the turbomachine.

Figure 4:
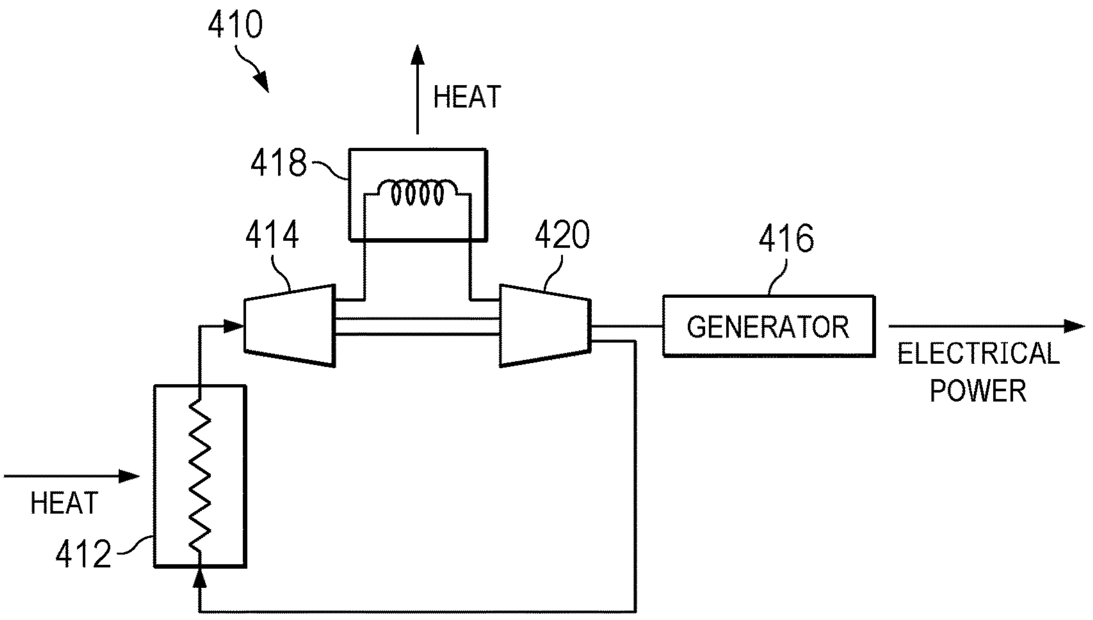
FIG. 4 is a schematic of a supercritical $CO_2$ power generation system.

FIG. 4 is a schematic of a supercritical $CO_2$ power generation system, where heat from a source is used to heat a thermal cycle 410 of supercritical $CO_2$. The thermal cycle 410 is like the thermal cycle 310, including a heat exchanger 412, a turbine 414, a generator 416, a condenser 418, and a compressor 420. The turbomachines described above can be incorporated as the turbine 414 and/or the compressor 420. In the case of a turbomachine as described above being used as the turbine 414, the generator 416 can be a separate generator or the electric machine of the turbomachine. If the turbine 414 and compressor 420 are not on the same shaft, in the case of a turbomachine as described above being used as the compressor 420, the electric machine of the turbomachine can be operated as a motor to drive the compressor 420. The turbomachine can be configured such that the heated working fluid flows through the hermetically sealed housing of the turbomachine.

A number of implementations have been described. Nevertheless, it will be understood that various modifications may be made without departing from the spirit and scope of this disclosure. Accordingly, other implementations are within the scope of the following claims.

What is claimed is:

1. A turbomachine, comprising:
an electric machine comprising:
an electric machine housing;
an electric stator within the housing;
an electric rotor comprising permanent magnets, the rotor being within the stator and electric machine housing and extending from an end of the electric machine housing; and
a plurality of active magnetic bearing actuators configured to levitate the electric rotor within the stator and provide both radial and axial support; and
a cylindrical sleeve between the electric machine housing and the stator, encircling and supporting the stator, the sleeve comprising axial flow passages therethrough;
a fluid end configured to drive or expand a working fluid of 250° C. or higher, the fluid end comprising:
a fluid end housing coupled to and hermetically sealed to the electric machine housing to define a hermetically sealed interior space therein that receives a portion of the working fluid, the interior of the fluid end housing sealed from the interior of the electric machine housing, where when working fluid leaks from the fluid end housing into the electric machine housing, the leaked working fluid is hermetically sealed within the electric machine housing, and where the axial flow passages allow working fluid in the electric machine housing to circulate in the electric machine housing axially through one end of the sleeve, out the other end of the sleeve and around the stator; and
an impeller or turbine within the fluid end housing and coupled about an end of the rotor to rotate at the same speed as the rotor.

2. The turbomachine of claim 1, where the impeller or turbine is an axial impeller or turbine and the fluid end housing is a volute.

3. The turbomachine of claim 1, where the impeller or turbine is a shrouded centrifugal type and where the fluid end housing is sealed to a surface of the shroud.

4. The turbomachine of claim 1, where the impeller or turbine comprises a multistage impeller or turbine.

5. The turbomachine of claim 1, comprising both an axial impeller or turbine and a centrifugal type impeller or turbine.

6. The turbomachine of claim 1, comprising:
an axial position sensor about a first end of the rotor, the sensor configured to measure the axial position of the first end of the rotor; and
a magnetic bearing controller communicatively coupled to a first of the bearing actuators and the axial position sensor, the controller being configured to control the axial position of the rotor relative to the electric machine housing based on a signal from the axial position sensor.

7. The turbomachine of claim 6, comprising a second of the plurality of bearing actuators, the second bearing actuator configured to provide radial support of the rotor and being positioned at an opposite end of the electric machine housing from the first bearing actuator.

8. The turbomachine of claim 1, comprising a heat transfer housing concentrically within and in contact with an inner surface of the electric machine housing, the heat transfer housing and electric machine housing defining a cooling fluid space therebetween, the cooling fluid space comprising a cooling fluid.

9. The turbomachine of claim 8, where the heat transfer housing comprises a helical channel on its outer surface that defines a portion of the cooling fluid space.

10. The turbomachine of claim 8, wherein the sleeve resides concentrically between the heat transfer housing and the stator, supporting the stator.

11. The turbomachine of claim 1, comprising an insulative ceramic washer clamped between the impeller or turbine and the rotor.

12. A turbomachine, comprising:
an electric machine comprising:
an electric machine housing;
an electric stator within the housing;
an electric rotor comprising permanent magnets, the rotor being within the stator and electric machine housing and extending from an end of the electric machine housing; and
a plurality of active magnetic bearing actuators configured to levitate the electric rotor within the stator and provide both radial and axial support; and
a fluid end configured to drive or expand a fluid of 250° C. or higher, the fluid end comprising:

a fluid end housing coupled to and hermetically sealed to the electric machine housing to define hermetically sealed interior space therein that receives a portion of the fluid; and an impeller or turbine within the fluid end housing and coupled about an end of the rotor to rotate at the same speed as the rotor, and where the electric machine housing comprises a front end face sealed to the outer surface of the rotor by a seal, and the turbomachine comprises a heat shield spaced from the front end face substantially covering the front end face and seal.

13. The turbomachine of claim 1, where a first of the bearing actuators is configured to provide axial control of the rotor position and being positioned about an end of the rotor opposite the end coupled to the impeller or turbine.

14. The turbomachine of claim 1, comprising paddles in a gap between the rotor and the stator and coupled to the rotor to rotate with the rotor, the paddles configured to drive flow of fluid through the gap.

15. A method, comprising:

operating a fluid end of a turbomachine to drive a 250° C. or hotter working fluid with an impeller or to drive a turbine of the turbomachine with the working fluid;

rotating a permanent magnet rotor of an electric machine of the turbomachine on an axis within a stator of the electric machine at the same speed as the impeller or turbine, the fluid end having a housing sealed to a housing of the electric machine to define a hermetically sealed space therein that receives a portion of the fluid, the interior of the housing of the fluid end sealed from the interior of the housing of the electric machine;

levitating the rotor within the stator of the electric machine with a plurality of active magnetic bearing actuators while controlling the axial position of the impeller or turbine; and receiving a portion of the working fluid that has leaked from the housing of the fluid end into the housing of the electric machine, hermetically sealing the leaked working fluid within the housing of the electric machine, and allowing the leaked working fluid to circulate through axial passages in a cylindrical sleeve residing concentrically within the housing of the electric machine.

16. The method of claim 15, comprising:

sensing an axial position of the rotor with an axial position sensor about the end of the rotor; and controlling the position of the impeller or turbine with a first of the bearing actuators relative to the fluid end based on a signal from the axial position sensor.

17. The method of claim 15, comprising circulating a cooling fluid between the housing of the electric machine and the stator.

18. The method of claim 17, where circulating a cooling fluid between the housing of the electric machine and the stator comprises circulating the cooling fluid through passages defined between the housing of the electric machine and an internal heat transfer housing concentrically within the electric machine housing.

19. The method of claim 18, comprising thermally insulating the impeller or turbine from a portion of the rotor with a ceramic washer clamped between the impeller or turbine and the rotor.

20. The method of claim 15, comprising providing axial support to the rotor with a first of the bearing actuators positioned about an end of the rotor opposite the impeller or turbine.

21. A turbomachine, comprising:

an electric machine comprising a rotor and a stator in a housing;

a fluid end configured to drive or expand a working fluid of 250° C. or higher, the fluid end comprising an impeller or turbine in a housing, the impeller or turbine coupled to the rotor to rotate at the same speed as the rotor and the housing of the fluid end is hermetically sealed to the housing of the electric machine to define a hermetically sealed space there that is configured to receive a portion of the working fluid and the interior of the housing of the fluid end is sealed from the interior of the housing of the electric machine;

a sleeve concentrically within the housing of the electric machine and defining axial passages therethrough, the sleeve in contact with and supporting the stator in the housing of the electric machine; and an active magnetic bearing system supporting the rotor, and where when working fluid leaks from the housing of the fluid end into the housing of the electric machine, the leaked working fluid is hermetically sealed within the housing of the electric machine, and where the leaked working fluid in the housing of the electric machine is allowed to circulate in the housing of the electric machine around the stator.

22. The turbomachine of claim 21, where the impeller or turbine is not an unshrouded centrifugal impeller or turbine.

23. The turbomachine of claim 21, comprising an axial rotor position sensor about an end of the rotor opposite the impeller or turbine.

24. The turbomachine of claim 21, comprising:

a heat transfer housing concentrically within and in contact with an inner circumference of the housing of the electric machine and defining a cooling fluid space between the heat transfer housing and the housing of the electric machine; and wherein the sleeve is concentrically within and in contact with an inner circumference of the heat transfer housing.

25. The turbomachine of claim 21, where the active magnetic bearing system comprises an axial bearing actuator about an end of the rotor opposite to the rotor or turbine.

* * * * *